(12) United States Patent
Seki et al.

(10) Patent No.: US 9,770,857 B2
(45) Date of Patent: Sep. 26, 2017

(54) INJECTION MOLDING SYSTEM

(71) Applicant: FANUC Corporation, Yamanashi (JP)

(72) Inventors: Naoaki Seki, Yamanashi (JP); Wataru Shiraishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 145 days.

(21) Appl. No.: 14/921,601

(22) Filed: Oct. 23, 2015

(65) Prior Publication Data

US 2016/0114512 A1  Apr. 28, 2016

(30) Foreign Application Priority Data

Oct. 24, 2014 (JP) .................................. 2014-217613

(51) Int. Cl.
*B29C 45/76* (2006.01)
*B29C 45/17* (2006.01)
*B29C 45/42* (2006.01)
*B29C 45/84* (2006.01)

(52) U.S. Cl.
CPC .......... *B29C 45/1761* (2013.01); *B29C 45/42* (2013.01); *B29C 45/84* (2013.01); *B29C 2945/76444* (2013.01); *B29C 2945/76795* (2013.01)

(58) Field of Classification Search
CPC .......... B29C 2945/76795; B29C 45/42; B29C 45/4225–2045/4283
See application file for complete search history.

(56) References Cited

U.S. PATENT DOCUMENTS

| | | | | |
|---|---|---|---|---|
| 3,907,483 A | * | 9/1975 | York | B29C 45/42 425/436 R |
| 2004/0005372 A1 | | 1/2004 | Shirahata et al. | |
| 2005/0196483 A1 | | 9/2005 | Kinoshita et al. | |
| 2005/0276877 A1 | | 12/2005 | Nihei et al. | |

FOREIGN PATENT DOCUMENTS

| | | | |
|---|---|---|---|
| CN | 1666853 A | | 9/2005 |
| CN | 202293173 U | | 7/2012 |
| DE | 19645463 | * | 6/1997 |
| JP | 61-195815 A | | 8/1986 |
| JP | S63-247016 A | | 10/1988 |
| JP | 5-192956 A | | 8/1993 |
| JP | 5-269789 A | | 10/1993 |
| JP | H06-155519 A | | 6/1994 |
| JP | 8-1721 A | | 1/1996 |
| JP | 2000-117799 A | | 4/2000 |
| JP | 2000-190260 A | | 7/2000 |
| JP | 2004-66682 A | | 3/2004 |
| JP | 2005-349762 A | | 12/2005 |
| JP | 2010-012720 A | | 1/2010 |

OTHER PUBLICATIONS

Office Action in JP Application No. 2014-217613, mailed Jan. 5, 2016.
Office Action in CN Application No. 201510696579.4, dated May 24, 2017.

* cited by examiner

*Primary Examiner* — Jill Heitbrink
(74) *Attorney, Agent, or Firm* — Hauptman Ham, LLP

(57) ABSTRACT

An injection molding system including a robot includes an injection molding device, and the robot is fixed in a machine housing of the injection molding device, and motion range of the robot includes interior region of the machine housing.

4 Claims, 5 Drawing Sheets

INJECTION MOLDING SYSTEM

RELATED APPLICATIONS

The present application claims priority to Japanese Application Number 2014-217613, filed Oct. 24, 2014, the disclosure of which is hereby incorporated by reference herein in its entirety.

BACKGROUND OF THE INVENTION

1. Field of the Invention

The present invention relates to an injection molding machine, and more specifically to an injection molding system including a robot in a machine housing of the injection molding device.

2. Description of the Related Art

The injection molding device includes a mold clamp unit and an injection unit opposing with each other on a machine housing, disposing molds in a mold clamping space of the mold clamp unit, performs mold clamping, injects a molten, kneaded resin to the mold by a cylinder of the injection unit for molding (Japanese Patent Laid-Open No. 2010-12720). In insertion molding, disposing operation of an insert workpiece (an insert component) to a molding space is necessary at mold opening. An product removing machine or an insert workpiece insertion device is provided around the injection molding machine and runner removing, product removing, and insertion of the insert workpiece is performed, in a case where the product removing machine or the insert workpiece insertion device is provided.

Japanese Patent Laid-Open No. 63-247016 discloses an injection molding product removing machine including a machine housing disposed from the below to the side of the molds of the injection molding machine, a first plate slidably provided on the machine housing, connected to a moving plate and configured to slide at the side of a mold in a mold opening direction, a second plate configured to slide in a direction perpendicular to the mold opening direction using a link mechanism connected to the machine housing and the first plate, and a chuck mechanism provided on the second plate.

Japanese Patent Laid-Open No. 6-155519 discloses a technique in which a set of an injection molding machine and a robot is used and the robot performs mold exchange operation, product removing operation, and the like.

However, when a robot such as an articulated robot, as the product removing machine or the insert workpiece insertion device, is used to perform these operations, a safety fence needs to be provided considering safety regulation. As a result, there has been a problem that large occupation area of the injection molding system including an injection molding machine and a robot is required.

In addition to that, when the injection molding machine is relocated by layout change of the factory, not only the injection molding machine but also the product removing machine and the insert workpiece insertion device need to be removed and relocated, thus the setting of each device is required after the relocation of the injection molding machine.

SUMMARY OF THE INVENTION

In view of the above-described problems in the prior art techniques, a purpose of the present invention is to provide an injection molding system having an injection molding machine and a robot, in which a robot is set in a machine housing of an injection molding machine and motion range of the robot is within an interior region of the machine housing.

An injection molding system including a robot according to the present invention includes a robot comprising an injection molding device, and the robot is fixed in a machine housing of the injection molding device, and motion range of the robot includes interior region of the machine housing.

The motion range of the robot may be in the interior region of the machine housing and motion range of a mold.

A cover of the injection molding device covering the motion range of the robot may work as a safety fence of the robot.

The robot may perform at least one of removing of a molded item from a mold, insertion of insert workpiece to the mold, collection of the molded item fallen from the mold, deburring of the molded item, cutting of a gate of the molded item, and removing of a runner.

A control device of the injection molding device may include an emergency stop signal outputting unit on injection molding device side configured to output an emergency stop signal of the injection molding device in case of emergency stop of the injection molding device, and a control device of the robot comprises an emergency stop signal inputting unit on robot side configured to input the emergency stop signal of the injection molding device to the robot, and the control device of the robot is configured to stop the robot based on the emergency stop signal of the injection molding device.

The control device of the robot may include an emergency stop signal outputting unit on injection robot side configured to output an emergency stop signal of the robot in case of emergency stop of the robot, and the control device of the injection molding device comprises an emergency stop signal inputting unit on injection molding device side configured to input the emergency stop signal of the robot to the injection molding deice, and the control device of the injection molding device is configured to stop at least a drive unit for mold clamping and molding protrusion based on the emergency stop signal of the robot.

The robot may perform at least one of removing of a molded item from a mold, insertion of insert workpiece to the mold, collection of the molded item fallen from the mold, deburring of the molded item, cutting of a gate of the molded item, and removing of a runner.

Since a robot capable of disposing an insert workpiece in molding space is set in the interior region of the machine housing of the molding machine, the relative positions of the robot and the injection molding machine are not changed, so alignment of the two after relocation is not necessary.

In addition to that, since the robot is within the machine housing of the injection molding machine, the robot does not interfere with a sling at slinging and craning operation for relocation of the machine, such that the workability is superior. Furthermore, the safety fence of the robot, which has been necessary, becomes unnecessary, and the occupancy area of the injection molding system can be reduced.

BRIEF DESCRIPTION OF THE DRAWINGS

The above-described object, the other object, and the feature of the invention will be proved from the description of embodiments below with reference to the accompanying drawings. In these drawings.

DETAILED DESCRIPTION OF THE PREFERRED EMBODIMENTS

Figure 1:
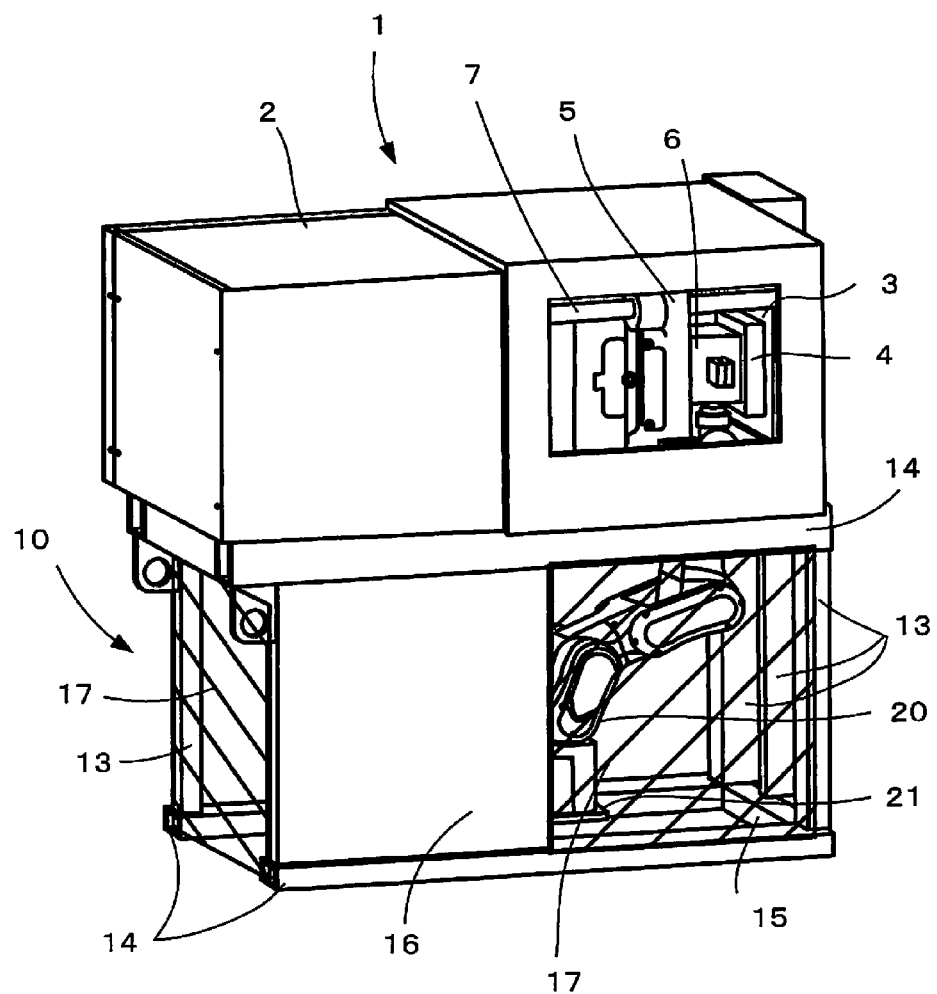
FIG. 1 is a diagram illustrating an injection molding system including a robot in the machine housing thereof.

FIG. 1 is a diagram illustrating an injection molding system including a robot including an articulated robot in the machine housing. FIG. 1 shows partial view from mold clamping device side. A injection molding machine 1 includes an injection device covered by a cover 2 and a mold clamping device, both opposing to each other on a machine housing 10 and in the longer direction. The mold clamping device includes a stationary platen 3 for attaching a stationary side mold 4, a movable platen 5 for attaching a movable side mold 6. The movable platen 5 is guided by a tie bar 7 and freely moves back and forth against the stationary platen 3.

The machine housing 10 configures a rectangular solid structure by an upper frame 11, a lower frame 12, and a support column 13 for supporting the upper frame 11. The upper frame 11 includes a pair of long shaped members 14 and transverse members 15. The lower frame 12 includes a pair of long shaped members 14 and transverse members 15. The upper frame 11 is supported by a plurality of columns standing on the lower frame 12. The sides of the upper frame 11 and the lower frame 12 are covered by a cover 16 and a cover 17 shown by an oblique line. The injection device and the mold clamping device are set over and on the pair of the long shaped members 14 of the upper frame 11 and in the direction of the long shaped member.

A robot 20 such as an articulated robot or the like is fixed in the space surrounded by the upper frames 11 and the lower frames 12 of the machine housing 10 including a rectangular solid structure. In an example shown in FIG. 1, the robot 20 is fixed independent from the injection molding machine 1 in the machine housing 10. That is, a stand mounting the robot 20 is mounted on a floor, on which the injection molding device 1 is set. The covers 16, 17 are attached for preventing the operator from going into the interior part of the machine housing. It should be noted that the cover 17 shown using the oblique line is not shown in the figures except for FIG. 1, for simplicity.

Movable region of the robot 29 in the machine housing 10 is limited to the interior region of the machine housing 10 of the injection molding machine 1 or the movement region of the molds between the movable platen 5 and the stationary platen 3 for opening and closing the molds where the molds are mounted and opening and closing is performed, or the both region. Therefore, the covers 16, 17, attached to the injection molding machine 1 act as a safety fence of the robot 20. For molding in which removing of the molded item is performed by free fall of the molded item from the mold, operation of the robot 20 for grasping the molded item in the mold does not included, and the motion space of the robot 20 may be limited to the interior region of the machining housing. The robot 20 may perform at least one of removing the molded item from the mold, insertion of an insert workpiece to the mold, collection of the molded item fallen from the mold, deburring of the molded item, cutting of a gate of the molding, and removing of a runner.

Figure 2:
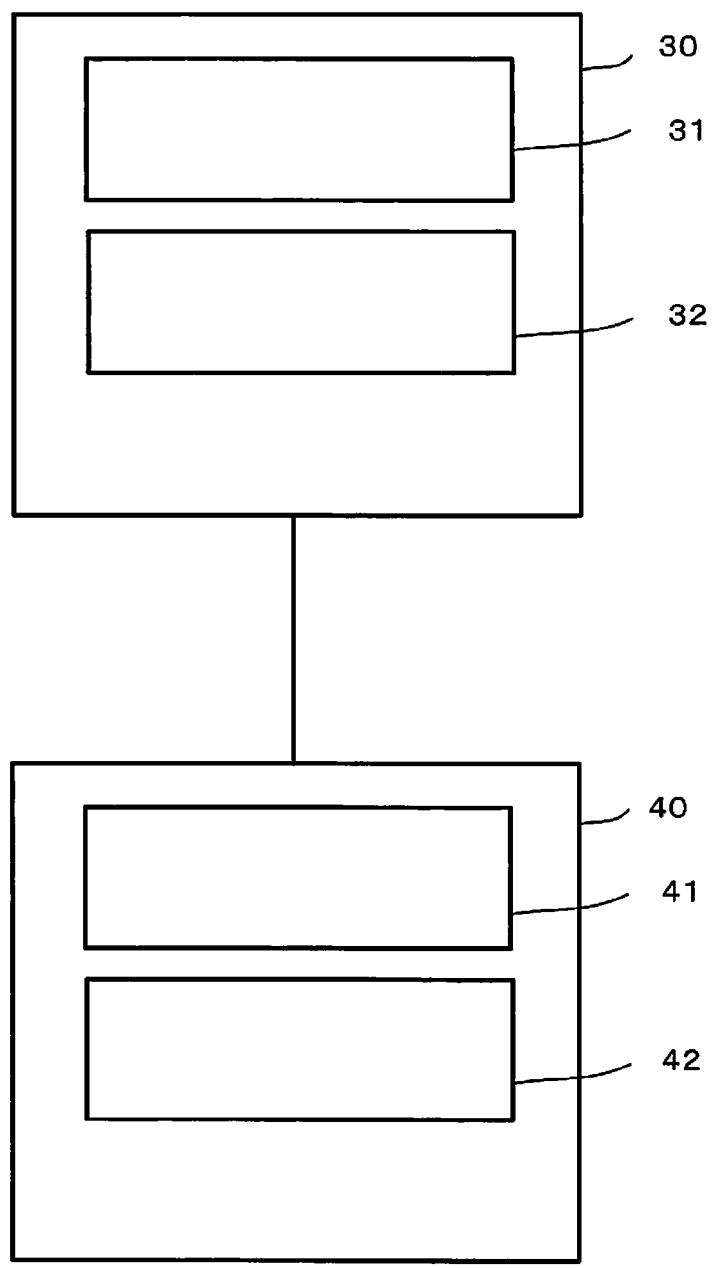
FIG. 2 is a diagram illustrating a control device of an injection molding system.

FIG. 2 is a diagram illustrating a control device of the injection molding system. The injection molding system in the present embodiment includes a numerical control device 30 for injection molding to control the injection molding machine 1, and a numerical control device 40 for robot control to control the robot 20. The numerical control device 30 of the injection molding machine and the numerical control device 40 of robot control include a signal input and output unit for sending signal to each other. The numerical control device 30 of the injection molding machine includes an injection molding device machine side emergency stop signal output unit 31, an injection molding device machine side emergency stop signal input unit 32. The injection molding device machine side emergency stop signal output unit 31 output injection molding device machine emergency stop signal for emergency stop of the injection molding machine 1.

The numerical control device 40 of robot control includes a robot side emergency stop signal input unit 42, and a robot side emergency stop signal output unit 41.

With the configuration, emergency stop is enabled based on the injection molding machine emergency stop signal of the injection molding machine 1, to be output, for example, when a front panel provided in a cover of the mold clamping device of the injection molding machine 1 is opened. The numerical control device 40 of robot control outputs robot emergency stop signal to the numerical control device 30 of the injection molding machine at emergency stop of the robot 20. The numerical control device 30 of the injection molding machine can perform emergency stop of a drive part which performs clamping operation and ejection operation of the molded item of the injection molding machine 1, based on the input robot emergency stop signal. With the configuration, damaging of the mold and the like can be prevented.

The injection molding device 1 may stop a drive part for injection, rotation of a screw, regulating of mold thickness, backward and forward movement of the injection unit, if necessary, based on the robot emergency stop signal input by the numerical control device 30 of the injection molding machine. The injection molding device 1 may further stop control of peripheral devices including a molding temperature regulator and a conveyer of molding material, to stop the entire molding system.

Figure 3:
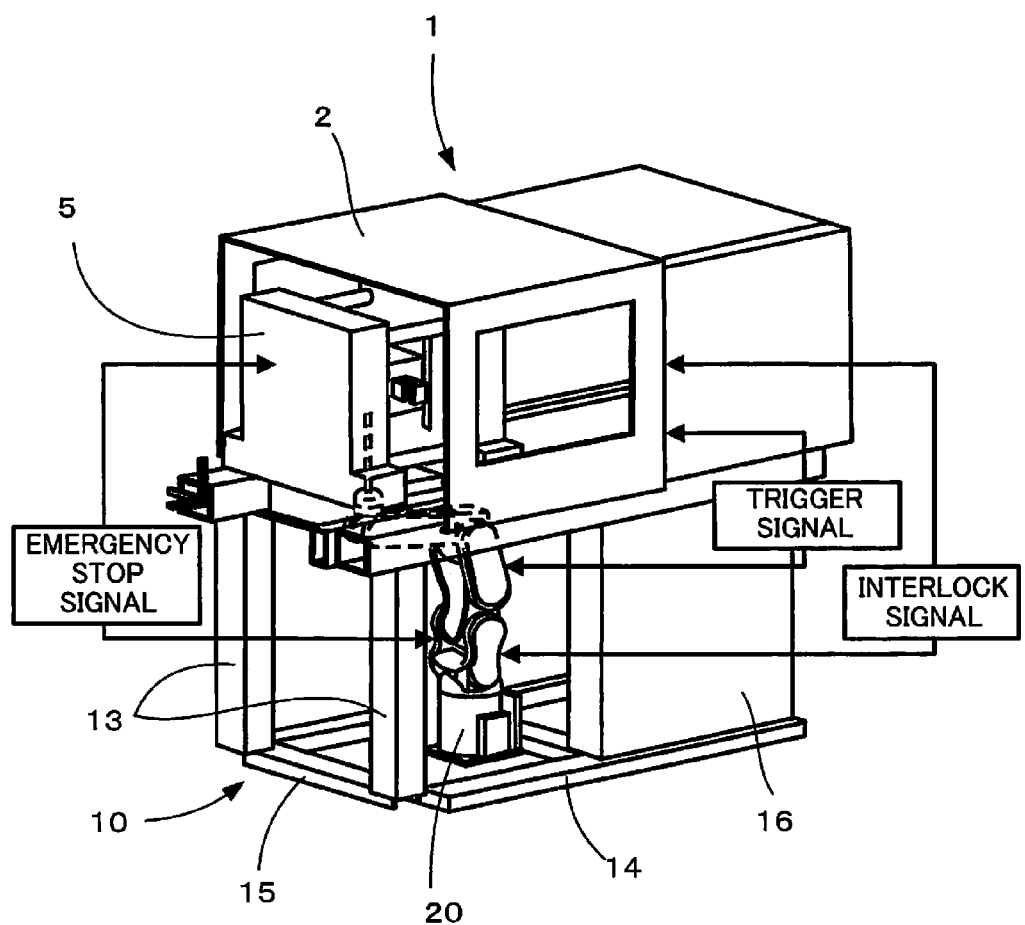
FIG. 3 is a diagram illustrating work for removing a workpiece by a robot in a machine housing.

FIG. 3 is a diagram illustrating work for removing a workpiece by a robot in a machine housing. In automatic operation, the numerical control device 40 of robot control acquires signal for permitting intrusion into the mold output from the injection molding machine 1 to the robot 20, then performs removing of the molded item and setting of the insert workpiece based on trigger signal including mold opening completion signal, ejector extrusion signal, ejector retreatment signal (refer to FIG. 3). When the robot 20 works in the mold, the robot 20 may output interlock signal to the injection molding machine 1 to prevent the process from proceeding to mold clamping process, such that the operation of the robot 20 can be synchronized with the injection molding device 1.

Figure 4:
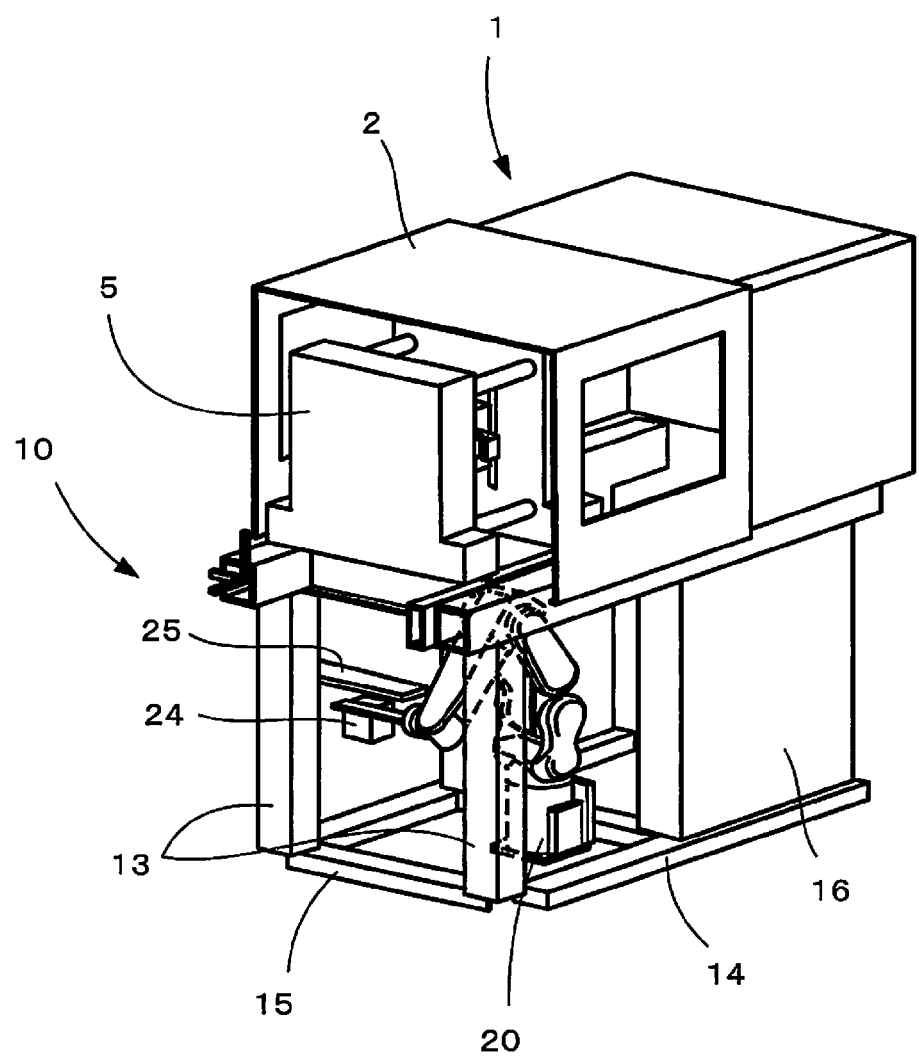
FIG. 4 is a diagram illustrating deburring by a robot in a machine housing.

The robot fixed in the machine housing 10 may perform not only removing of the molded item but also the previous process and the post process in the machine housing. The previous process includes process for setting the workpiece in the heating furnace for pre-heating of the insert workpiece and setting of the heated insert workpiece in the mold. In FIGS. 3, 4, the tie bar 7 piercing the four corners of the movable platen 5 is not shown.

FIG. 4 is a diagram illustrating deburring by the robot in the machine housing. The post process includes a process of setting a product taken out from the mold (the movable platen 6) in a gate cutting device (not shown in the figures) to cut the gate, a process of deburring of the molded item using the deburring device 24 and aligning and setting the deburred molded item on a conveyer 25. In the present embodiment, the robot 20 fixed in the machine housing 10 performs removing of the molded item from the mold (the movable platen 6), conveying of the molded item to the deburring unit 24, and aligning of the molded item deburred by the deburring device 24 on the conveyer 25.

Figure 5:
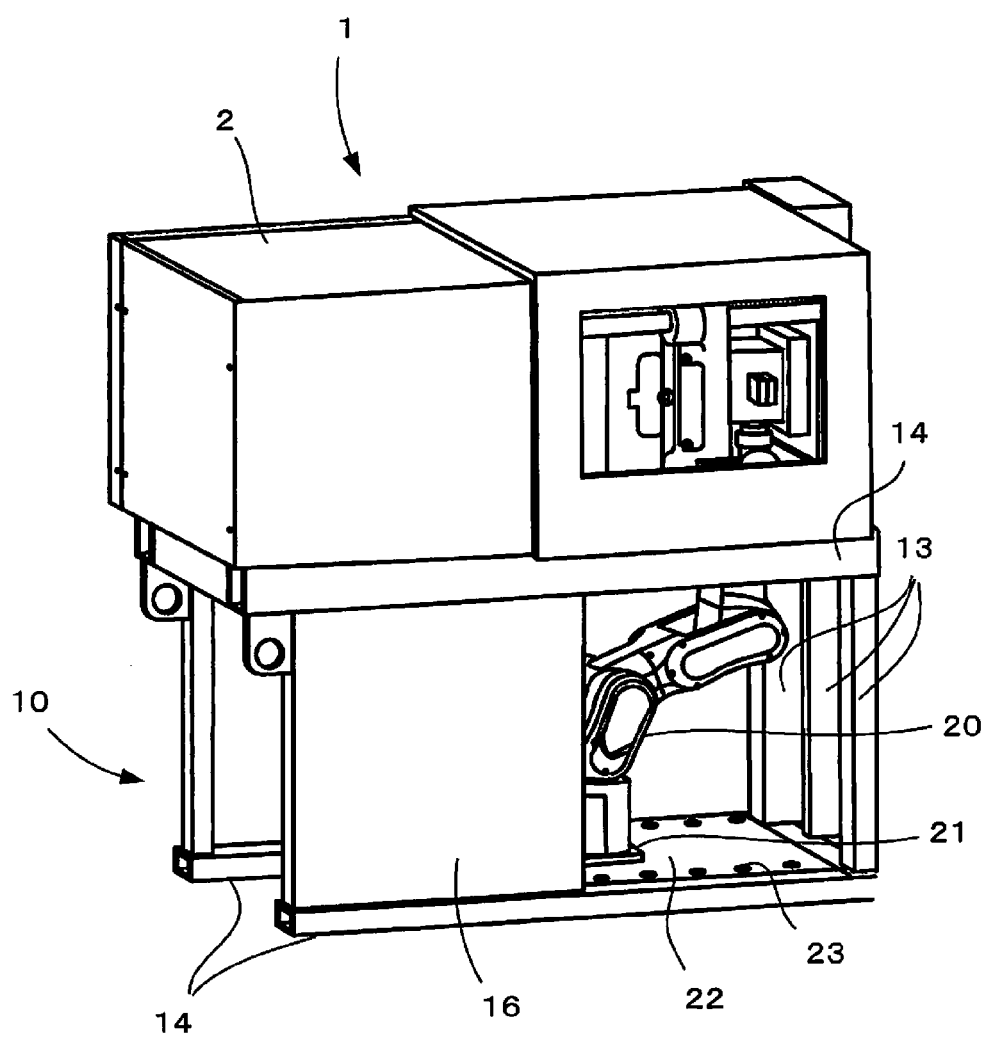
FIG. 5 is an injection molding system including a robot fixed in a machine housing.

FIG. 5 is the injection molding system including the robot fixed in the machine housing. A stand 21 for attaching the robot 20 is fixed to a fixed plate 22, and the fixed plate 22 is fixed to the machine housing 10 of the injection molding machine 1 using a fixing bolt 23. Same motion space of the robot 20 and same emergency stop circuit is set as in FIGS. 1 to 4. The robot 20 may be fixed directly to the main housing 10. A safety fence may be provided as the injection molding system shown in FIG. 1.

The invention claimed is:

1. An injection molding system comprising an injection molding device and an articulated robot, wherein
the articulated robot is fixed to a lower portion of a mold clamping device in a machine housing of the injection molding device,
the motion range of the articulated robot includes the interior region of the machine housing and the region within the motion range of a mold,
a cover of the injection molding device covering the motion range of the articulated robot is configured to work as a safety fence of the articulated robot, and
the articulated robot is configured to perform at least one of the removal of a molded item from the mold, insertion of an insert workpiece into the mold, collection of the molded item fallen from the mold, deburring of the molded item, cutting of a gate of the molded item, or the removal of a runner.

2. The injection molding system according to claim 1, wherein
a control device of the injection molding device comprises an emergency stop signal outputting unit on the injection molding device side configured to output an emergency stop signal of the injection molding device in case of an emergency stop of the injection molding device, and
a control device of the articulated robot comprises an emergency stop signal inputting unit on the robot side configured to input the emergency stop signal of the injection molding device to the robot, and
the control device of the articulated robot is configured to stop the articulated robot based on the emergency stop signal of the injection molding device.

3. The injection molding system including a robot according to claim 1, wherein
the control device of the articulated robot comprises an emergency stop signal outputting unit on the robot side configured to output an emergency stop signal of the robot in case of an emergency stop of the articulated robot,
the control device of the injection molding device comprises an emergency stop signal inputting unit on the injection molding device side configured to input the emergency stop signal of the robot to the injection molding device, and
the control device of the injection molding device is configured to stop at least a drive unit for mold clamping and a molded item protruding operation based on the emergency stop signal of the robot.

4. The injection molding system including a robot according to claim 2, wherein
the control device of the articulated robot comprises an emergency stop signal outputting unit on the robot side configured to output an emergency stop signal of the robot in case of an emergency stop of the articulated robot,
the control device of the injection molding device comprises an emergency stop signal inputting unit on the injection molding device side configured to input the emergency stop signal of the robot to the injection molding device, and
the control device of the injection molding device is configured to stop at least a drive unit for mold clamping and a molded item protruding operation based on the emergency stop signal of the robot.

* * * * *